United States Patent [19]

Morgenthaler et al.

[11] Patent Number: 5,103,909
[45] Date of Patent: Apr. 14, 1992

[54] PROFILE CONTROL IN ENHANCED OIL RECOVERY

[75] Inventors: Lee N. Morgenthaler; William H. Korcz; John L. Greak, all of Houston; James R. Erickson, Katy, all of Tex.

[73] Assignee: Shell Oil Company, Houston, Tex.

[21] Appl. No.: 657,031

[22] Filed: Feb. 19, 1991

[51] Int. Cl.$^5$ .................. E21B 33/138; E21B 43/24
[52] U.S. Cl. ........................... 166/288; 166/270; 166/272; 166/295; 166/300; 166/303; 523/130
[58] Field of Search ............. 166/270, 272, 288, 295, 166/300, 303; 523/130

[56] References Cited

U.S. PATENT DOCUMENTS

| | | | |
|---|---|---|---|
| 3,490,533 | 1/1970 | McLaughlin | 166/270 |
| 3,669,188 | 6/1972 | Coles et al. | 166/288 X |
| 3,749,172 | 7/1973 | Hessert et al. | 166/274 |
| 3,782,467 | 1/1974 | Hessert | 166/261 |
| 3,785,437 | 1/1974 | Clampitt et al. | 166/281 |
| 3,984,333 | 10/1976 | Van de Kraats | 166/275 X |
| 4,110,226 | 8/1978 | Swaonson | 166/275 |
| 4,141,842 | 2/1979 | Abdo | 252/8.554 |
| 4,246,124 | 1/1981 | Swanson | 252/8.551 |
| 4,296,203 | 10/1981 | Wernau | 435/104 |
| 4,595,513 | 6/1986 | Morgenthaler et al. | 252/8.551 |
| 4,640,361 | 2/1987 | Smith et al. | 166/288 |
| 4,653,585 | 3/1987 | Chung et al. | 166/275 |
| 4,670,305 | 6/1987 | Morgenthaler et al. | 427/239 |
| 4,683,949 | 8/1987 | Sydansk et al. | 166/270 |
| 4,706,754 | 11/1987 | Smith | 166/295 |
| 4,776,398 | 10/1988 | Chu et al. | 166/295 X |
| 4,785,883 | 11/1988 | Hoskin et al. | 166/270 |
| 4,804,043 | 2/1989 | Shu et al. | 166/288 X |
| 4,845,134 | 7/1989 | Mumallah et al. | 523/130 |
| 4,871,021 | 10/1989 | Shu | 166/270 |
| 4,907,656 | 3/1990 | Sanchez et al. | 166/270 |
| 4,909,324 | 3/1990 | Shu | 166/275 |
| 4,947,933 | 8/1990 | Jones et al. | 166/263 |
| 4,950,698 | 8/1990 | Shu et al. | 523/130 |

*Primary Examiner*—George A. Suchfield
*Attorney, Agent, or Firm*—Del S. Christensen

[57] ABSTRACT

Oil recovery method using polymer solutions in which highly permeable strata are made significantly less permeable while less permeable strata are not made significantly less permeable. This is accomplished by heating more permeable strata by injection of hot fluids, and then injection of a crosslinkable vinyl aromatic-conjugated diolefin polymer and a temperature activated crosslinking agent. A crosslinked gel is formed in the initially more permeable strata, permitting recovery of oil from the initially less permeable strata.

17 Claims, No Drawings

PROFILE CONTROL IN ENHANCED OIL RECOVERY

FIELD OF THE INVENTION

This invention relates to a polymer gel profile control composition and to the use of such a composition in enhanced oil recovery.

BACKGROUND OF THE INVENTION

Thermally augmented petroleum recovery, for example, hot water flooding, steam flooding and steam soaking operations, are widely practiced to recover oils with high in-situ viscosity and hence low mobility. Such oils are often found in rock formations having varying permeabilities and other heterogeneity that causes the hot fluid (water or steam) to enter one stratum or part of a stratum in preference to the others. In addition, gravity forces may cause the steam to rise to the top of a stratum and water to sink to the bottom of a stratum. The stratum which receives more flow becomes depleted of oil and no longer contributes to the economic benefit of the oil recovery process. Furthermore, because this stratum receives substantially all the heated injection or soak fluid, it is significantly hotter than other strata.

Numerous methods have been described for selectively plugging subterranean strata in oil recovery operations using delayed gel formation processes. U.S. Pat. No. 4,640,361 describes the application of thermally responsive aqueous silicate compositions, U.S. Pat. No. 4,785,883 describes the use of organic polysilicate esters in aqueous solutions, and U.S. Pat. No. 4,706,754 describes the application of aqueous solutions of a water-soluble polymer, a metal carboxylate crosslinking agent, and a delaying agent.

Several compositions particularly advantageous to steam soak and/or steam flood operations have also been described. U.S. Pat. No. 4,845,134 describes gellable aqueous compositions containing a monomer and one or more temperature sensitive crosslinkers for steam diversion. U.S. Pat. No. 4,907,656 describes a method of application of aqueous gellable compositions for preventing steam channeling into a non-aquifer bottom water zone.

U.S. Pat. Nos. 4,871,021 and 4,909,324 describe block copolymers useful in oil recovery operations. These describe aqueous solutions of block copolymers that can be crosslinked in high brine concentration reservoirs to yield high strength gels. Like the other crosslinkable polymers, they are water soluble and tend to concentrate in the aqueous regions of the formation.

Crosslinkers taught by the prior art in, for example, U.S. Pat. No. 4,909,324 include multivalent metal cations. These crosslinkers can be made to be temperature activated by the method taught in U.S. Pat. No. 4,907,656. This patent discloses utilizing a temperature dependent reduction of chromium to generate the crosslinking $Cr^{+3}$ ion in-situ. Unfortunately, the aqueous environment of the highly permeable zones which are the targets of these gels dilute both the crosslinkers and the aqueous solutions of polymers. Hydrocarbon bearing zones, on the other hand, do not interfere with the crosslinking process. It would be preferable to have an oil phase polymer solution because the oil bearing strata would dilute any polymer solution which does reach it and diminish any crosslinking. The oil soluble polymers would also be less subject to hydrolysis by the aqueous environment of the highly permeable strata which are the targets of the profile control additives. Additionally, multivalent metal cations indigenous in the brines and rock formations will not have as great an effect on either the crosslinkers or the oil base polymers. Crosslinking would therefore be more predictable, controllable, and selective to the highly permeable strata if oil soluble polymers were utilized.

The known profile control polymer solutions have viscosities which decrease with increasing temperatures. But a more drastic change in viscosity between common low permeability strata temperatures and highly permeable strata temperatures would be preferred. This drastic change in viscosity would tend to permit greater penetration of polymer solutions into the highly permeable strata. This change in viscosity would also prevent penetration of lower temperature strata, permitting subsequent oil recovery.

An oil soluble crosslinkable polymer solution useful in well treating fluids is taught in U.S. Pat. No. 4,595,513. This composition is useful in fracture fluids and for transportation of masses of granular solids into voids in subterranean formations. The object of these polymeric additives are to provide a nearly constant viscosity over a broad temperature range. This is a significant improvement for fluids designed to transport solids due to the importance of viscosity in the suspension of solids. Profile control additives of the present invention have viscosities which are both time and temperature dependent.

It is therefore an object of the present invention to provide a process to preferentially decrease permeability of more permeable strata of subterranean formations. It is a further object to provide such a process in which a polymer gel which is oil soluble is utilized, and in which the polymer gel is crosslinked selectively in the more permeable strata.

SUMMARY OF THE INVENTION

Objects of the present invention are accomplished by a process which comprises the steps of: a) injecting a heat medium into the formation thereby increasing the temperature of at least a portion of a highly permeable strata to above a crosslinking temperature and not increasing the temperature of a less permeable strata to above the crosslinking temperature; and b) injecting into the formation a polymer solution comprising a continuous hydrocarbon phase, a block copolymer comprising at least one conjugated diolefin block containing ethylenic unsaturation and at least one vinyl aromatic block and having a glass transition temperature which is greater than the temperature of the less permeable strata and less than the crosslinking temperature, and a free radical crosslinking agent wherein the free radical crosslinking agent is capable of crosslinking the block copolymer at the crosslinking temperature in a quarter of an hour to 72 hours and cross links the block copolymer at the temperature of the less permeable strata at a rate of one-tenth or less of the rate at crosslinking temperatures.

The block copolymers of the present invention comprise rubbery conjugated diolefin blocks, which may optionally be partially hydrogenated. These rubbery blocks impart reactive crosslinking sites and gelling properties. The vinyl aromatic blocks impart higher viscosities below the glass transition temperature of the blocks. This glass transition temperature is generally below the crosslinking temperatures and above the temperature of the lower temperature less permeable strata. This results in both significant and preferred selectivity and reactivity for the polymer as it contacts the different strata. In the case of the less permeable cooler strata, the higher viscosity and the lower reactivity of the polymer largely preclude penetration and gelling. In the more permeable hotter strata the lower viscosity and the higher reactivity causes preferential penetration and then gelling in this strata. These two effects are further enhanced by the presence or absence of hydrocarbons. Less polymeric material is therefore wasted by penetration into less permeable strata, and gelling in the less permeable strata is minimized.

DETAILED DESCRIPTION OF THE INVENTION

The method of this invention requires that a heat medium be injected into a subterranean formation, the formation having strata of varying permeability. The heat medium is preferably steam, hot water, or a combination of steam and water. Hot water when utilized as the heat medium, is preferably of a temperature of about 220° F. or more. This step of the process may be a thermally augmented enhanced oil recovery process. The present invention is normally incorporated when more permeable strata have become hydrocarbon depleted, and it is desired to redirect flow to less permeable strata which contain hydrocarbons.

The temperature to which the more permeable strata will be raised is in excess of a crosslinking temperature. The crosslinking temperature is the temperature at which the free radical crosslinking agent utilized will crosslink the block copolymer utilized in about one-quarter of an hour to about 72 hours. The polymer is considered cross-linked when the solution of polymer reaches a viscosity of ten times its initial viscosity when held at the crosslinking temperatures.

The difference in permeability between the strata of the formation is preferably such that a temperature difference of about 80° F. or greater may be established. More preferably, the temperature difference is 150° F. or greater.

Not all of the more permeable strata need be at or above the crosslinking temperature, and some of the lower permeability strata will inevitably be heated by the heating process. The difference in permeability must be significant enough to direct significantly more of the heat into the more permeable strata. The temperature of the more permeable strata is preferably above about 240° F. and more preferably above 280° F. and less than about 600° F. The maximum temperature is limited by the thermal stability of the polymer.

The block copolymer solution injected to the formation is a block copolymer which is injected in a solution with oil. The oil must have sufficient aromatic content to render the polymer soluble at surface temperature to provide a pumpable solution. Depending on the polymer molecular weight and aromatic content, and the solvent molecular weight, this minimum aromatic content may range from none to as high as 25 percent by weight. The aromatic content should not be more than about 50 percent by weight to maintain the desired viscosity-temperature relationship at temperatures above about 50° C.

A hydrocarbon solvent in the diesel fuel distillation range is a preferred hydrocarbon solvent. Crude oil may also be a useful and relatively inexpensive solvent. A diesel fuel distillation range solvent can dissolve a sufficient quantity of polymer, and is available at reasonable costs. By contrast, a largely aliphatic kerosene will be a poor solvent, and result in only swelled polymer solutions and unacceptably high room temperature viscosities at reasonable concentrations when the styrene content of the polymer is greater than about 20 weight percent.

The block copolymers employed in the present composition are thermoplastic elastomers and have at least one vinyl aromatic polymer end block A and at least one elastomeric conjugated diene polymer mid block B. The number of blocks in the block copolymer is no of special importance and the macromolecular configuration may be linear or branched, which includes graft, radial or star configurations. The radial or star configuration may be either symmetric or asymmetric. Typical block copolymers of the most simple configuration would have the structure polystyrene-polybutadiene-polystyrene (S-B-S) and polystyrene-polyisoprene-polystyrene (S-I-S). A typical radial or star polymer would comprise one in which the diene block has three or four branches (radial) or five or more branches (star), the tip of some (asymmetric) or each (symmetric) branch being connected to a polystyrene block.

The radial block copolymer may have arms which are selected from the group consisting of $-AB$, $-BA$, $-A$, $-B$ and combinations thereof, where A is a predominantly vinyl aromatic polymer block and B is a predominantly conjugated diolefin polymer block with the proviso that at least one of each type of block is present.

Blocks A and B may be either homopolymer, random or tapered copolymer blocks as long as each block predominates in at least one class of the monomers characterizing the blocks defined herein before. Thus, blocks A may comprise styrene/alpha-methylsytrene copolymer blocks or styrene/butadiene random or tapered copolymer blocks as long as the blocks individually predominate in alkenyl arenes. The A blocks are preferably monoalkenyl aromatics. The term "monoalkenyl aromatic" will be taken to include particularly those of the benzene series such as styrene and its analogs and homologs including alpha-methylstyrene and ring alkylated styrenes, particularly ring methylated styrenes, and other monoalkenyl polycyclic aromatic compounds such as vinyl naphthalene and the like. The preferred monoalkenyl aromatics are styrene and alpha-methylstyrene, and styrene is particularly preferred.

The blocks may comprise homopolymers of conjugated diene monomers, copolymers of two or more conjugated dienes, and copolymers of one of the dienes with a monoalkenyl arene as long as the blocks B predominate in conjugated diene units. The conjugated dienes are preferably ones containing from 4 to 8 carbon atoms. Examples of suitable such conjugated diene monomers include: butadiene, isoprene, 2,3-dimethyl-1,3-butadiene, and piperylene, preferably butadiene and isoprene.

Such block copolymers may contain various ratios of conjugated dienes to vinyl aromatics. The proportion of the vinyl aromatic is between about 1 and about 99 percent by weight of the block copolymer. To exhibit elastomeric properties, the proportion of the vinyl aromatic blocks in these block copolymers is between preferably about 2 and about 65 percent, and more preferably between about 5 and about 40 percent by weight.

The average molecular weights of the individual blocks may vary within certain limits. In most instances, the vinyl aromatic blocks will have average molecular weights in the order of about 1,000 to about 125,000, preferably about 1,000 to about 60,000, while the conjugated diene blocks either before or after hydrogenation will have average molecular weights in the order of about 10,000 to about 450,000, preferably about 10,000 to about 150,000. The total average molecular weight of the block copolymer is typically in the order of about 14,000 to about 2,000,000, preferably from about 14,000 to about 270,000. These molecular weights are most accurately determined by gel permeation chromatography.

The block copolymer may be produced by any anionic block polymerization or copolymerization procedures including sequential addition of monomer techniques, incremental addition of monomer technique and coupling technique as illustrated in, for example, U.S. Pat. Nos. 3,251,905; 3,390,207; 3,598,887; and 4,219,627, incorporated herein by reference. Tapered copolymer blocks can be incorporated in the multiblock copolymer by copolymerizing a mixture of conjugated diene and vinyl aromatic monomers utilizing the difference in their copolymerization reactivity rates. Various patents describe the preparation of multiblock copolymers containing tapered copolymer blocks including U.S. Pat. Nos. 3,251,905; 3,265,765; 3,639,521; and 4,208,356, incorporated herein by reference. Additionally, various patents describe the preparation of symmetric and asymmetric radial and star block copolymers including U.S. Pat. Nos. 3,231,635; 3,265,765; 3,322,856; 4,391,949; and 4,444,953, incorporated herein by reference.

These polymers and copolymers are preferably hydrogenated to increase their thermal stability and resistance to oxidation. The hydrogenation of these polymers and copolymers may be carried out by a variety of well established processes including hydrogenation in the presence of such catalysts as Raney nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a hydrogenation catalyst. Such processes are disclosed in U.S. Pat. Nos. 3,113,986 and 4,226,952, incorporated herein by reference.

Greater than about 75 percent of the initial ethylenic unsaturation and less than about 25 percent of the initial aromatic saturation of the polymer can be eliminated by hydrogenation.

Mixtures of these block copolymers are also useful, as are mixtures of these block copolymers with other crosslinkable polymers and mixtures of oligomers and monomers such as hydrophobic monofunctional and multifunctional acrylic and methacrylic monomers.

Temperature dependent crosslinking is provided by incorporating an appropriate crosslinking agent to react with the block copolymer at an acceptable rate in the hotter strata and at about 1/10 of this rate in the cooler strata of the well. In the hotter strata an immobile gel is produced that prevents further steam injection or production. Gel is not produced in the cooler strata because of the slower reaction, shallower invasion and dilution of the polymer solution with oil.

These block copolymers may be utilized with minor amounts of stabilizers and antioxidants. These stabilizers and antioxidants are often incorporated in commercially available polymers to increase shelf life and u.v. stability.

Numerous crosslinking agents can be used to form immobile gels with such polymers. One broad class of such agents is free radical forming compounds. These compounds undergo thermal decomposition to produce free radicals that react with one or more of the polymer blocks to form a three-dimensional gel network. Crosslinking compounds in the present invention include azo compounds, allyl or acyl peroxides or hydroperoxides, ketoperoxides, peroxy esters, peroxy carbonates, and peroxy ketals. Such compounds vary in the temperature at which their reaction is initiated and crosslinking becomes extensive. Where desirable, more than one may be used in order to provide crosslinking over a broader temperature range.

The period of time between contact of the solution with the hotter strata and the development of initial gelling can be advantageously altered by the addition of inhibitors. Antioxidants and free radical quenchers, such as t-butylcatechol and other dihydroxbenzenes, hydroquinones, benzoquinone and other quinones, are known in the art as effective free radical inhibitors. Incorporation of such inhibitors lengthens time to initial gelling without compromise of the effectiveness or functional performance of the gel produced. Inhibitors generally function by competing with polymer chains for free radical crosslink precursor events. Inhibitors largely preclude the polymer chains from being exposed to a significant amount of free radicals while they are present. Upon their sacrificial exhaustion, the polymer crosslinking occurs due to the concentration of free radical producing material in the solution upon inhibitor exhaustion.

The concentration of polymer in the polymer solution may vary from about 5 to about 25 weight percent, and is preferably between about 8 and about 12 weight percent. At lower concentrations, the gels formed by crosslinking the polymers have less than the desired strength, and at higher concentrations, the viscosity of the solutions becomes too high.

The concentration of crosslinking agent within the polymer solution will vary according to the amount of polymer present, the desired time for crosslinking, the amount of ethylenic unsaturation of the block copolymer, and the type of crosslinking agent. Generally, between about 0.2 about 5.0 percent by weight will be required. More preferably, between about 0.5 and about 2.0 percent by weight based on total solution will be required.

The injection of the polymer composition could be followed by injection of an aqueous composition to ensure that the polymer which does penetrate the less permeable zones is cooled and spread further through the less permeable zone. This prevents plugging the less permeable zones after the gel is established in the formerly more permeable zones. Brine or seawater can be used as the aqueous composition. Brine or seawater are preferred when the formation contains clay due to the undesirable effect of fresh water on clay containing formations. The injection of the aqueous composition can then be followed by resumption of the thermal enhanced oil recovery process, i.e., the steam or hot water flooding or soaking operation.

EXAMPLE 1

A block copolymer solution was prepared and crosslinked under conditions which are expected to be prevalent in a more permeable layer of a subterranean formation.

The block copolymer utilized was 10 percent by weight polymer in diesel oil. The diesel oil was 37 percent by weight aromatic components, and 63 percent by weight aliphatic components. The polymer was a triblock polystyrene-polybutadiene-polystyrene block copolymer having a weight average molecular weight of about 200,000, and a styrene content of about 20 percent. The block copolymer contained about 0.3 percent by weight of Ionol, a commercially available antioxidant (based on the block copolymer).

The copolymer solution had a viscosity at 300° F. of about 50 cp and at 150° F. of about 200 cp. This significant difference in viscosity is attributable, in part, due to the glass transition temperature of the polystyrene blocks being about 100° C.

The crosslinker utilized was di-tertiary butyl peroxide in a concentration of about 0.6 volume percent based on the total solution.

The viscosity of this solution was measured as a function of temperature to determine if it was pumpable at temperatures which would not induce crosslinking and to determine if the solution would selectively penetrate higher temperature regions of the formation. The viscosity at 100° F. was about 450 cp, the viscosity at 150° F. was 207 cp, and the viscosity at 300° F. was 50 cp. A solution of 450 cp viscosity is pumpable. A significant reduction in viscosity also was demonstrated. This would result in much more selective injection of the polymer solution into strata which is above a temperature of about 200° F.

A portion of the polymeric solution containing the di-tertiary butyl peroxide was then held at 300° F. for about two hours while periodic viscosity measurements were taken. Until about 75 minutes there was no significant increase in viscosity. The viscosity increased to about 500 cp by 90 minutes, and at 100 minutes was at a viscosity of about 2500 cp. A gel had been established essentially between 75 and 100 minutes of exposure to a 300° F. temperature.

EXAMPLE 2

The temperature-time requirement for effective crosslinking was determined for two polymers and three crosslinkers.

Polymer A was the polymer of Example 1. Polymer B had a molecular weight of about 110,000 and a styrene content of about 30 percent by weight. Polymer B was about 80 percent polystyrene-polybutadiene diblock, and about 20 percent coupled diblock arms forming S-B-S triblocks.

Both polymers were utilized as 10 percent by weight solutions in diesel oil. Both solutions contained about 0.3 weight percent Ionol based on the block copolymer. The diesel oil was similar to that utilized in Example 1.

Crosslinker A was the ditertiary butyl peroxide used in Example 1. Crosslinker B was Lupersol 130, a 2,5-dimethyl 1-2,5 di(t-butyl peroxy)hexyne-3. Crosslinker C was Lupersol 230, a n-butyl-4,4 bis(t-butyl peroxy)-valerate.

The gel formation times were determined for combinations of block copolymers and varying amounts of the crosslinker at varying temperatures. The results are in Table 1 below.

TABLE 1

| Polymer Type | Crosslinker Type | Crosslinker Concentration (Weight Percent) | Temperature (°F.) | Gel Formation Time (Minutes) |
|---|---|---|---|---|
| A | C | 3.5 | 270 | 3 |
| A | C | 3.5 | 240 | 9.5 |
| A | A | 1 | 300 | 30 |
| A | A | 1 | 275 | 185 |
| A | A | 0.6 | 300 | 60 |
| A | A | 0.6 | 275 | 330 |
| B | A | 1.6 | 350 | 9.5 |
| B | A | 1.6 | 320 | 34 |
| B | A | 1.6 | 300 | 120 |
| B | A | 1.6 | 275 | 500 |
| B | B | 1.7 | 300 | 136 |
| B | B | 2.0 | 300 | 124 |
| B | B | 1.3 | 300 | 190 |

EXAMPLE 3

A minimum crosslinker concentration and polymer concentration are required to form a gel. This minimum concentration depends on the polymer type and crosslinker type. Examples of compositions that did not gel are given in Table 2. The polymers and crosslinkers were as identified in Example 2.

TABLE 2

| Polymer Type | Polymer Concentratin (In Diesel Weight Percent) | Crosslinker Type | Crosslinker Concentration (Weight Percent) | Temperature (°F.) |
|---|---|---|---|---|
| A | 5 | A | 1.0 | 300 |
| A | 10 | A | 0.2 | 300 |
| B | 10 | B | 0.7 | 300 |

In many thermal enhanced oil recovery processes, the formation temperatures in strata having good permeability will be heated to above about 300° F., whereas strata having lower permeability have temperatures below about 225° F. Such formations provide excellent opportunities for the practice of the present invention. Injection of a solution such as that of the example will form a stable gel within the more highly permeable strata. Resumption of the thermal enhanced oil recovery will then result in increased flow through less permeable strata and increased production of oil from the formation.

We claim:

1. A process to reduce permeability in highly permeable strata of a permeable subterranean formation having at least one highly permeable stratum and at least one less permeable stratum comprising the steps of:
    a) injecting a heat medium into the formation thereby increasing the temperature of at least a portion of the highly permeable strata to above a crosslinking temperature and not increasing the temperature of the less permeable strata to above the crosslinking temperature;
    b) injecting into the formation a polymer solution comprising a continuous hydrocarbon phase, a block copolymer comprising at least one conjugated diolefin block containing ethylenic unsaturation and at least one vinyl aromatic block and having a glass transition temperature which is greater than the temperature of the less permeable strata and less than the crosslinking temperature, and a free radical crosslinking agent wherein the free radical crosslinking agent is capable of crosslinking the block copolymer at the crosslinking temperature in a quarter of an hour to 72 hours and crosslinks the block copolymer at the temperature of the less permeable strata at a rate of one tenth or less of the rate at crosslinking temperatures; and c) crosslinking at least a portion of the polymer within the highly permeable strata and thereby reducing the permeability of the highly permeable strata.

2. The process of claim 1 wherein the crosslinking temperature is between about 240° F. and about 600° F.

3. The process of claim 1 wherein the heat medium is steam.

4. The process of claim 1 wherein the heat medium is liquid water at a temperature of about 220° F. or more.

5. The process of claim 1 wherein the free radical crosslinking agent is selected from the group consisting of alkyl peroxides, dialkyl peroxides, hydroperoxides, acyl peroxides, and peroxy ketals.

6. The process of claim 1 wherein the block copolymer is a linear triblock copolymer having a conjugated diolefin midblock and two vinyl aromatic end blocks.

7. The process of claim 6 wherein the block copolymer is a partially hydrogenated block copolymer, with greater than about 75 percent of the initial ethylenic unsaturation and less than about 25 percent of the initial aromatic unsaturation eliminated by hydrogenation.

8. The process of claim 1 wherein the block copolymer is of a radial configuration.

9. The process of claim 8 wherein the radial block copolymer has arms which are selected from the group consisting of —AB, —BA, —A, —B and combinations thereof, where A is a predominately vinyl aromatic polymer block and B is a predominately conjugated diolefin polymer block with the proviso that at least one of each type of block is present.

10. The process of claim 9 wherein the radial block copolymer is a selectively hydrogenated block copolymer with greater than about 75 percent of the initial ethylenic unsaturation hydrogenated and less than about 25 percent of the initial aromatic unsaturation eliminated by hydrogenation.

11. The process of claim 1 wherein the continuous hydrocarbon phase is diesel oil.

12. The process of claim 1 further comprising the step of following the injection of the polymer solution with injection of an aqueous composition.

13. The process of claim 12 wherein the aqueous composition is brine.

14. The process of claim 12 further comprising the step of following the injection of the liquid aqueous material with injection of steam.

15. The process of claim 1 wherein the polymer solution further comprises an amount of inhibitor effective to prevent crosslinking at the temperature of the formation for at least about 15 minutes.

16. The process of claim 15 wherein the inhibitor is a free radical quencher or an antioxidant.

17. The process of claim 15 wherein the inhibitor is a hydroquinone.

* * * * *